(12) United States Patent
Campbell

(10) Patent No.: US 11,845,544 B2
(45) Date of Patent: Dec. 19, 2023

(54) FOLDABLE AIRCRAFT

(71) Applicant: Bell Textron Inc., Fort Worth, TX (US)

(72) Inventor: Kip Gregory Campbell, Hurst, TX (US)

(73) Assignee: TEXTRON INNOVATIONS, INC., Providence, RI (US)

(*) Notice: Subject to any disclaimer, the term of this patent is extended or adjusted under 35 U.S.C. 154(b) by 199 days.

(21) Appl. No.: 17/135,232

(22) Filed: Dec. 28, 2020

(65) Prior Publication Data

US 2022/0204152 A1   Jun. 30, 2022

(51) Int. Cl.
| | |
|---|---|
| B64C 39/02 | (2023.01) |
| B64C 29/02 | (2006.01) |
| B64U 10/25 | (2023.01) |
| B64U 30/12 | (2023.01) |
| B64U 50/19 | (2023.01) |
| B64U 80/00 | (2023.01) |

(52) U.S. Cl.
CPC ............ *B64C 39/024* (2013.01); *B64C 29/02* (2013.01); *B64U 10/25* (2023.01); *B64U 30/12* (2023.01); *B64U 50/19* (2023.01); *B64U 80/00* (2023.01)

(58) Field of Classification Search
CPC ........... B64C 29/02; B64C 1/063; B64C 1/30; B64C 1/16; B64C 2201/028; B64C 2201/20; B64C 2201/102; B64C 3/56; B64C 3/32; B64U 80/00; B64U 20/50; B64U 30/293
See application file for complete search history.

(56) References Cited

U.S. PATENT DOCUMENTS

| | | | | |
|---|---|---|---|---|
| 7,959,104 | B2* | 6/2011 | Kuntz | B64C 29/0033 244/50 |
| 9,821,909 | B2* | 11/2017 | Moshe | B64C 27/22 |
| 10,413,763 | B2* | 9/2019 | Won | A62C 3/025 |
| 10,870,477 | B1* | 12/2020 | Nilson | B64C 1/063 |
| 11,275,389 | B2* | 3/2022 | Qu | G01M 1/12 |
| 2009/0008499 | A1* | 1/2009 | Shaw | B64C 27/28 244/17.23 |
| 2016/0122016 | A1* | 5/2016 | Mintchev | B64C 39/024 244/17.23 |
| 2016/0176520 | A1* | 6/2016 | Goldstein | B64C 39/024 244/17.23 |
| 2017/0088291 | A1* | 3/2017 | Hesse | B64C 29/02 |
| 2017/0183081 | A1* | 6/2017 | Du | B64C 27/10 |
| 2018/0105254 | A1* | 4/2018 | Tian | B64C 39/024 |
| 2018/0118322 | A1* | 5/2018 | Harris | B64C 1/063 |
| 2018/0327092 | A1* | 11/2018 | Deng | B64C 1/30 |
| 2018/0354620 | A1* | 12/2018 | Baek | B64C 39/024 |

(Continued)

*Primary Examiner* — Joshua J Michener
*Assistant Examiner* — Arfan Y. Sinaki
(74) *Attorney, Agent, or Firm* — Akona IP PC

(57) ABSTRACT

One embodiment is an aircraft including a main body, a plurality of propulsion assemblies, and a plurality of hinges, wherein each of the plurality of propulsion assemblies is rotatably coupled to the main body using a hinge from the plurality of hinges. In an example, the aircraft includes four motor support arms and each motor support arm rotatably couples a specific propulsion assembly to a specific corresponding hinge on the main body of the aircraft and increases a span of the aircraft when the aircraft is in the flight configuration and reduces the footprint of the aircraft when the aircraft is in a storage configuration.

19 Claims, 16 Drawing Sheets

(56) References Cited

U.S. PATENT DOCUMENTS

| | | | |
|---|---|---|---|
| 2019/0071178 A1* | 3/2019 | Caubel | A63H 27/12 |
| 2019/0077503 A1* | 3/2019 | Reddy | B64C 3/56 |
| 2019/0084673 A1* | 3/2019 | Chen | B64C 39/024 |
| 2019/0112025 A1* | 4/2019 | Sugaki | B64C 39/024 |
| 2019/0193844 A1* | 6/2019 | Zheng | B64C 25/26 |
| 2020/0079495 A1* | 3/2020 | Yang | B64C 29/0033 |
| 2020/0130803 A1* | 4/2020 | Xiao | B64C 1/063 |
| 2020/0164978 A1* | 5/2020 | Perini | B64C 29/0016 |
| 2020/0277040 A1* | 9/2020 | Liu | B64C 11/28 |
| 2020/0324885 A1* | 10/2020 | Bernard | B64C 39/12 |
| 2021/0078704 A1* | 3/2021 | Blakstad | H01M 50/20 |

* cited by examiner

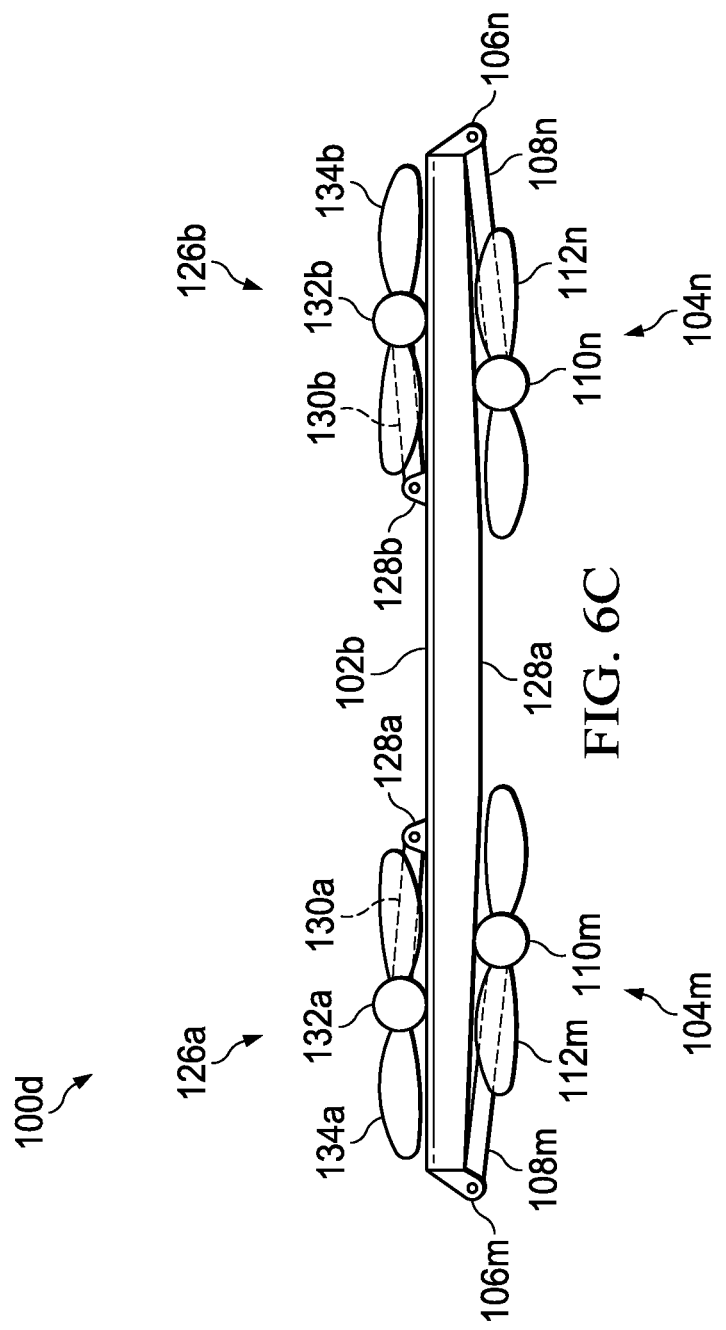

FOLDABLE AIRCRAFT

TECHNICAL FIELD

This disclosure relates generally to aircraft and, more particularly, to a foldable vertical take-off and landing ("VTOL") aircraft.

BACKGROUND

Unlike fixed-wing aircraft, vertical take-off and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical take-off and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical take-off, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

SUMMARY

One embodiment is an aircraft including a main body, a plurality of propulsion assemblies, and a plurality of hinges, where each of the plurality of propulsion assemblies is rotatably coupled to the main body using a hinge from the plurality of hinges. In an example, the aircraft includes four motor support arms and each motor support arm rotatably couples a specific propulsion assembly to a specific corresponding hinge on the main body of the aircraft and increases a span of the aircraft when the aircraft is in the flight configuration and reduces the footprint of the aircraft when the aircraft is in a storage configuration.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIG. 6C is simplified diagram of an aircraft in accordance with an embodiment of the present disclosure;

Figure 1A:
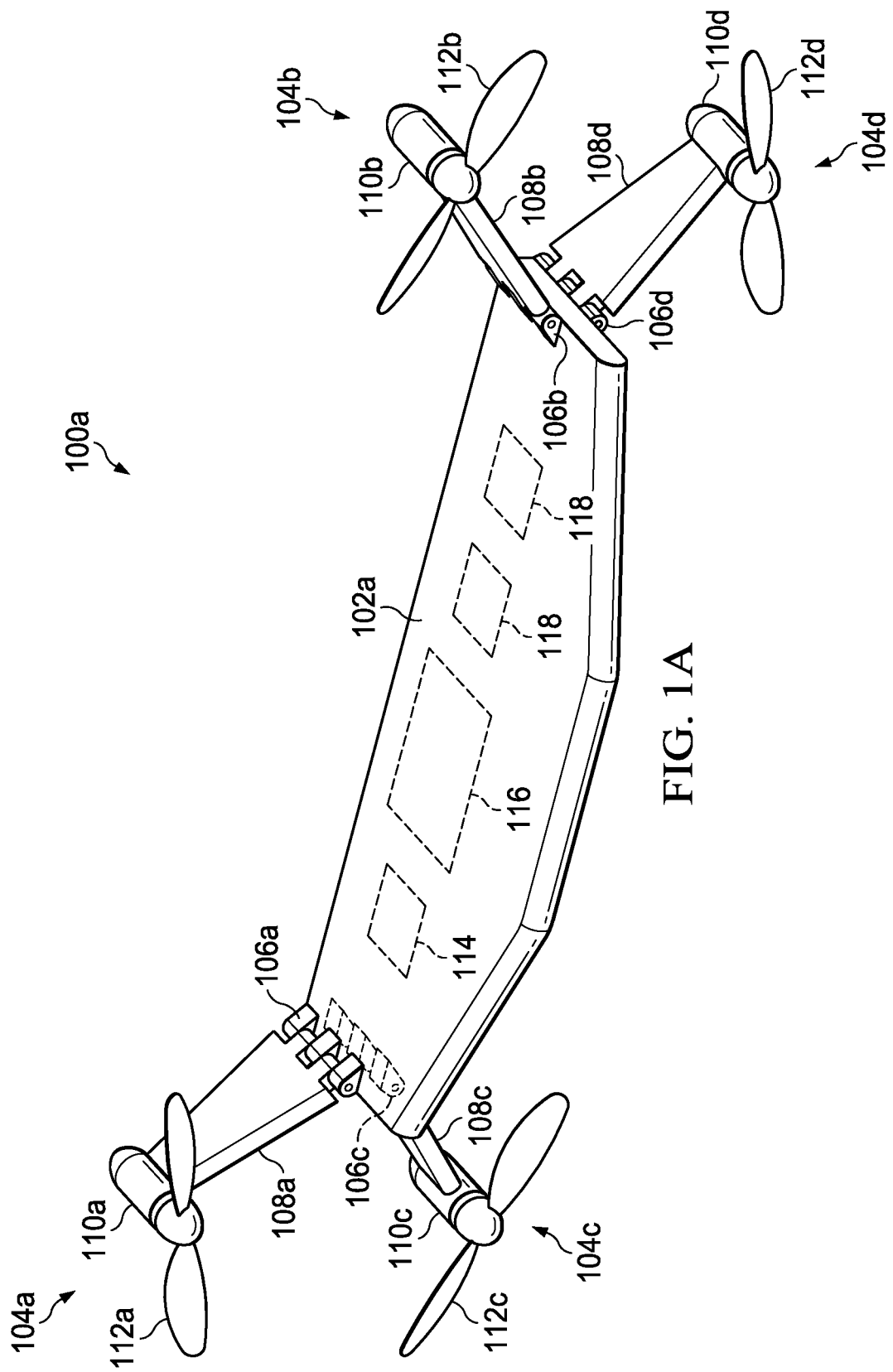
FIG. 1A is simplified diagram of an aircraft in accordance with an embodiment of the present disclosure.

The FIGURES of the drawings are not necessarily drawn to scale, as their dimensions can be varied considerably without departing from the scope of the present disclosure.

DETAILED DESCRIPTION

The following disclosure describes various illustrative embodiments and examples for implementing the features and functionality of the present disclosure. Features such as structure(s), function(s), and/or characteristic(s), for example, are described with reference to one embodiment as a matter of convenience; various embodiments may be implemented with any suitable one or more of the described features. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

In the following disclosure, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus fifteen percent (±15%) variation.

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

FIG. 1A is a simplified diagram of an aircraft 100a in a flight configuration, in accordance with an embodiment of the present disclosure. Aircraft 100a is generally configured as a foldable, hovering capable aircraft that does not need any actuators. Aircraft 100a is generally configured as a vertical take-off and landing ("VTOL") aircraft, more specifically a convertible drone aircraft, that is operable in a helicopter mode (shown in FIG. 3) associated with vertical take-off from and landing to a landing zone, hover, and sideward and rearward mobility or flight, and an airplane mode (shown in FIG. 1) associated with forward flight. Additionally, because aircraft 100a is a convertible aircraft, it is also operable in a conversion mode when transitioning between the helicopter and airplane modes. Further, being a drone-type aircraft, aircraft 100a is configured for remote control and operation. Additionally, at least in some embodiments, aircraft 100a may be fully made autonomous and self-directed via a predetermined or preprogrammed location-based guidance system (e.g., global positioning system ("GPS"), coordinate-based location, street address, etc.).

In an example, aircraft 100a can include a main body 102a and a plurality of propulsion assemblies 104a-104d. Each propulsion assemblies 104a-104d can include a motor, and a plurality of rotor blades. More specifically, as illustrated in FIG. 1A, propulsion assembly 104a includes motor 110a and a plurality of rotor blades 112a, propulsion assembly 104b includes motor 110b and a plurality of rotor blades 112b, propulsion assembly 104c includes motor 110c and a plurality of rotor blades 112c, and propulsion assembly 104d includes motor 110d and a plurality of rotor blades 112d.

Each of propulsion assemblies 104a-104d can be coupled to a motor support arm. For example, as illustrated in FIG.

1A, propulsion assembly 104a is coupled to motor support arm 108a, propulsion assembly 104b is coupled to motor support arm 108b, propulsion assembly 104c is coupled to motor support arm 108c, and propulsion assembly 104d is coupled to motor support arm 108d. Each motor support arm 108a-108d is coupled to main body 102a using a hinge. For example, as illustrated in FIG. 1A, motor support arm 108a is rotatably coupled to main body 102a using hinge 106a, motor support arm 108b is rotatably coupled to main body 102a using hinge 106b, motor support arm 108c is rotatably coupled to main body 102a using hinge 106c, and motor support arm 108d is rotatably coupled to main body 102a using hinge 106d.

Main body 102a can include a flight controller 114, a battery 116, and electronics 118. Electronics 118 can include a wireless communication module, payload sensor, a plurality of aircraft sensors, an orientation sensor, a control system, and/or other electronics to help enable aircraft 100a operate. Main body 102a can help provides lift to aircraft 100a during forward flight while also maintaining a relatively small footprint of aircraft 100a. Each of motor support arms 108a-108d provide structure and support to propulsion assemblies 104a-104d during operation of aircraft 100a. During use, the ends of main body 102a and propulsion assemblies 104a-104d can help to provide a base for the landing gear. In the embodiment shown, each motor 110a-110d is an electric motor. However, in other embodiments, each motor 110a-110d may be a combustion engines or auxiliary power unit through a plurality of interconnect driveshafts and/or auxiliary gearboxes. Furthermore, because aircraft 100 functions as a convertible aircraft, the rotational speeds of each rotor blades 112 may be selectively controlled to orient aircraft 100 in the various flight modes.

Figure 1B:
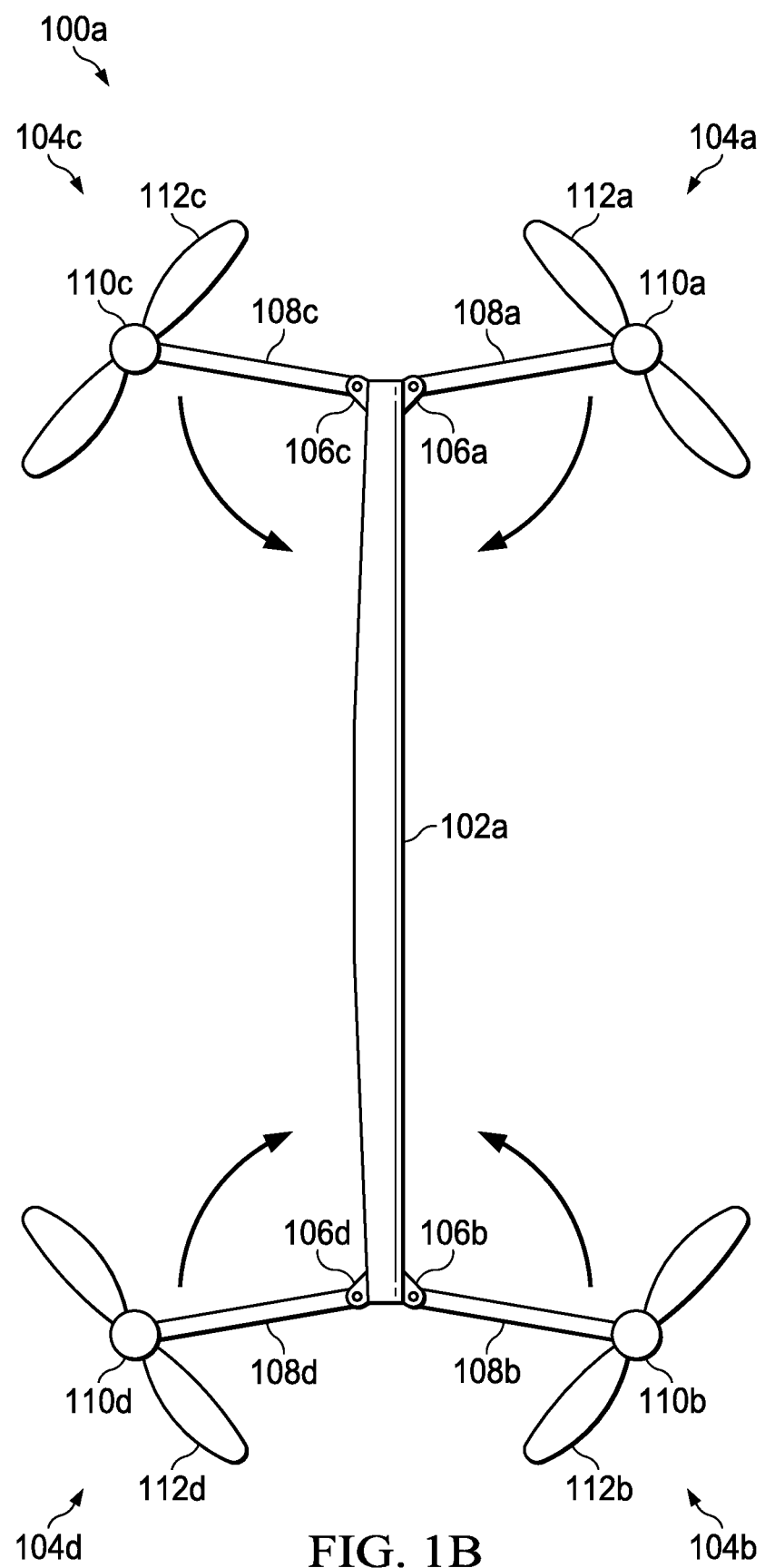
FIG. 1B is simplified diagram of an aircraft in accordance with an embodiment of the present disclosure.

Turning to FIG. 1B, FIG. 1B is a simplified diagram of aircraft 100a in transition from a flight configuration to a stored configuration, in accordance with an embodiment of the present disclosure. Aircraft 100a can include main body 102a and plurality of propulsion assemblies 104a-104d. Propulsion assembly 104a can include motor 110a and plurality of rotor blades 112a, propulsion assembly 104b can include motor 110b and plurality of rotor blades 112b, propulsion assembly 104c can include motor 110c and plurality of rotor blades 112c, and propulsion assembly 104d can include motor 110d and plurality of rotor blades 112d. Propulsion assembly 104a can be coupled to motor support arm 108a, propulsion assembly 104b can be coupled to motor support arm 108b, propulsion assembly 104c can be coupled to motor support arm 108c, and propulsion assembly 104d can be coupled to motor support arm 108d.

Motor support arm 108a is rotatably coupled to main body 102a using hinge 106a, motor support arm 108b is rotatably coupled to main body 102a using hinge 106b, motor support arm 108c is rotatably coupled to main body 102a using hinge 106c, and motor support arm 108d is rotatably coupled to main body 102a using hinge 106d. When propulsion assemblies 104a-104d are not in use, each of motor support arms 108a-108d can be folded inward on a corresponding hinge 106a-106d to help aircraft 100a have a relatively small footprint during storage. More specifically, as illustrated in FIG. 1B, motor support arm 108a can be rotated towards main body 102a using hinge 106a, motor support arm 108b can be rotated towards main body 102a using hinge 106b, motor support arm 108c can be rotated towards main body 102a using hinge 106c, and motor support arm 108d can be rotated towards main body 102a using hinge 106d.

Figure 1C:
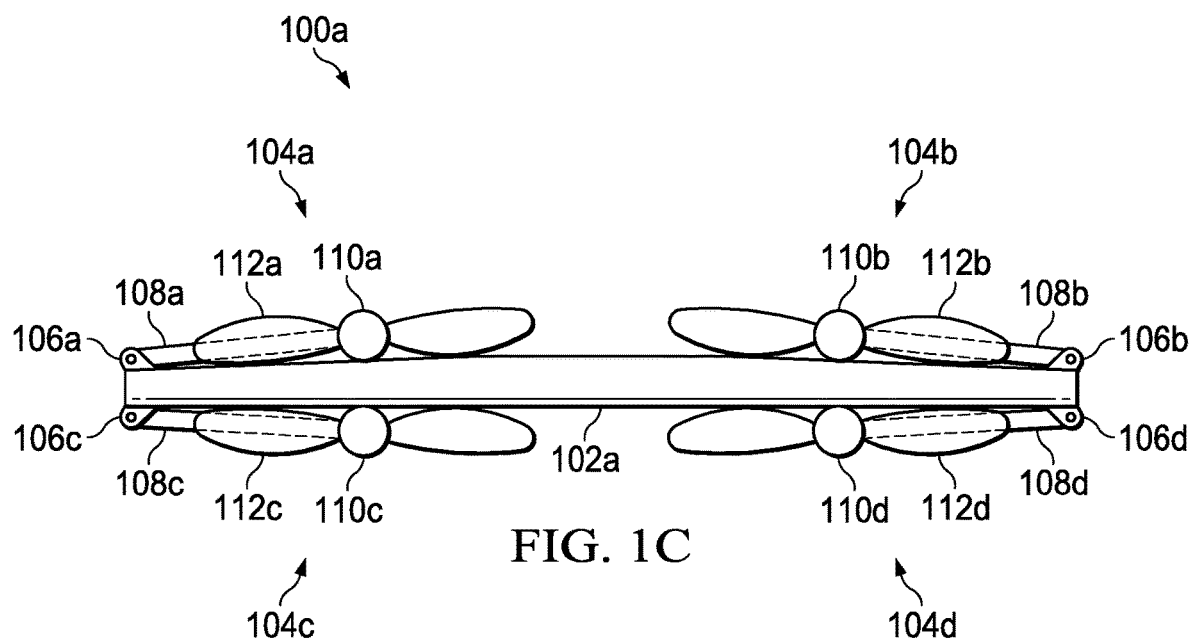
FIG. 1C is simplified diagram of an aircraft in accordance with an embodiment of the present disclosure.

Turning to FIG. 1C, FIG. 1C is a simplified diagram of aircraft 100a in a stored configuration, in accordance with an embodiment of the present disclosure. Aircraft 100a can include main body 102a and plurality of propulsion assemblies 104a-104d. Propulsion assembly 104a can include motor 110a and plurality of rotor blades 112a, propulsion assembly 104b can include motor 110b and plurality of rotor blades 112b, propulsion assembly 104c can include motor 110c and plurality of rotor blades 112c, and propulsion assembly 104d can include motor 110d and plurality of rotor blades 112d. Propulsion assembly 104a can be coupled to motor support arm 108a, propulsion assembly 104b can be coupled to motor support arm 108b, propulsion assembly 104c can be coupled to motor support arm 108c, and propulsion assembly 104d can be coupled to motor support arm 108d.

Motor support arm 108a is rotatably coupled to main body 102a using hinge 106a, motor support arm 108b is rotatably coupled to main body 102a using hinge 106b, motor support arm 108c is rotatably coupled to main body 102a using hinge 106c, and motor support arm 108d is rotatably coupled to main body 102a using hinge 106d. When propulsion assemblies 104a-104d are not in use, each of motor support arms 108a-108d can be folded inward on a corresponding hinge 106a-106d to help aircraft 100a have a relatively small footprint during storage. More specifically, as illustrated in FIG. 1C, motor support arm 108a can be rotated towards main body 102a using hinge 106a, motor support arm 108b can be rotated towards main body 102a using hinge 106b, motor support arm 108c can be rotated towards main body 102a using hinge 106c, and motor support arm 108d can be rotated towards main body 102a using hinge 106d. This allows aircraft 100a to occupy a relatively small footprint when not in use and/or being stored.

As illustrated in FIGS. 1A-1C, aircraft 100a is a foldable, hovering capable aircraft that does not need any actuators and can take off and land vertically as well as fly like an airplane. When not in use and/or being stored, aircraft 100a, more specifically, motor support arms 108a-108d, can be folded to occupy a relatively small footprint without needing aerodynamic or model airplane servos. During use, motor support arms 108a-108d extend the span of aircraft 100a and decrease the span load. In addition, motor support arms 108a-108d can help in capturing some of the wing tip vortex energy outward and help to reduce induced drag. Surface actuators are not needed as the pitch, roll, and yaw control, both in hover and in forward flight, are provided by propulsion assemblies 104a-104d.

As markets emerge for autonomous unmanned aircraft (or "UAVs"), it becomes important for the aircraft to occupy a small footprint when not in use. This is particularly challenging for VTOL UAVs. For example, in some current systems the aircraft includes a flight control system with aerodynamic or airplane servos and/or surface actuators that can occupy a relatively large footprint. In addition, some current systems are not neutrally stable or slightly stabilizing and efficiency of the aircraft during travel is reduced due to the instability of the aircraft as energy is used to keep the aircraft stable. As the aircraft travels faster, there is less thrust capability out of the propellers and some of the energy of the aircraft is used for controlling stability rather than being available for thrust. What is needed is an aircraft, especially a UAV that can occupy a small footprint when not in use.

An aircraft 100a, as outlined in FIGS. 1A-1C, can resolve these issues (and others). In an example implementation, aircraft 100a can be configured for vertical take-off and landing from a perched configuration. In addition, aircraft 100a can include relatively simple single axis folding mechanisms and wing-tip motor attachments. This allows for different configurations and independent tailoring of the wing planform to suit mission and flight mechanics requirements. For example, propeller fore/aft design locations may be adjusted to affect longitudinal and directional stability as needed. Also, wing-tip/motor support fins can be configured for low drag motor integration, span extension that reduces the induced drag of the wing, and improved longitudinal and directional stability. Further, aerodynamic surface actuators are not required. In some specific examples, aircraft 100a may have a total weight of about 0.5 pounds to about ten (ten) pounds.

Also, in accordance with the teachings of certain embodiments described herein, during operation the aircraft is caused to perform several maneuvers. Such maneuvers may include a roll maneuver (i.e., a rotation about a longitudinal (front to rear) axis of the aircraft, defined herein as the X axis), a pitch maneuver (i.e., a rotation about a lateral (right to left) axis of the aircraft, defined herein as the Y axis) and/or a yaw maneuver (i.e., a rotation about a vertical (top to bottom) axis of the aircraft, defined herein as the Z axis). More specifically, for hover control, pitch (attitude) can be controlled using upper and lower differential thrust from propulsion assemblies 104a-104d, roll (attitude) can be controlled using left horizontal/right horizontal (LH-RH) differential thrust from propulsion assemblies 104a-104d, and yaw (heading) can be controlled using differential torque of propulsion assemblies 104a-104d. For forward flight control, pitch can be controlled using upper and lower differential thrust from propulsion assemblies 104a-104d, roll can be controlled using differential torque of propulsion assemblies 104a-104d, and yaw can be controlled using LH-RH differential thrust from propulsion assemblies 104a-104d.

Figure 3:
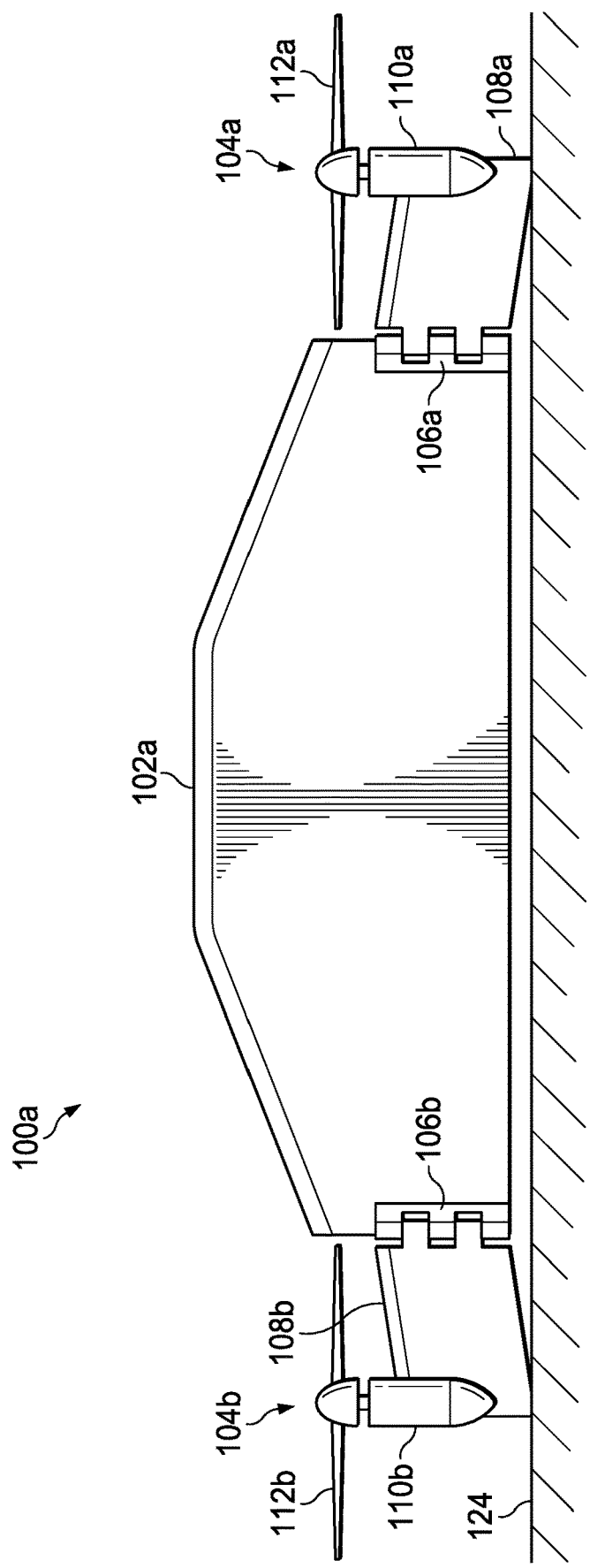
FIG. 3 is simplified diagram of an aircraft in accordance with an embodiment of the present disclosure.

The configuration of aircraft 100a allows propulsion assemblies 104a-104d to fold inboard for relatively compact storage. In addition, motor support arms 108a-108d can be configured to provide a low drag fin surface and help to reduce induced drag. Also, motor support arms 108a-108d can be configured to help improve directional and longitudinal stability as well as offer perch landing capability (e.g., as illustrated in FIG. 3). Propulsion assemblies 104a-104d and, if present on the aircraft, a plurality of main body propulsion rotor blades (e.g., of main body propulsion rotor blades 134a and 134b illustrated in FIG. 6A), can be located aft of the center of gravity of aircraft 100a to help improve directional and longitudinal stability. In addition, aircraft 100a can be configured to help provide low download losses while in hover.

Figure 2:
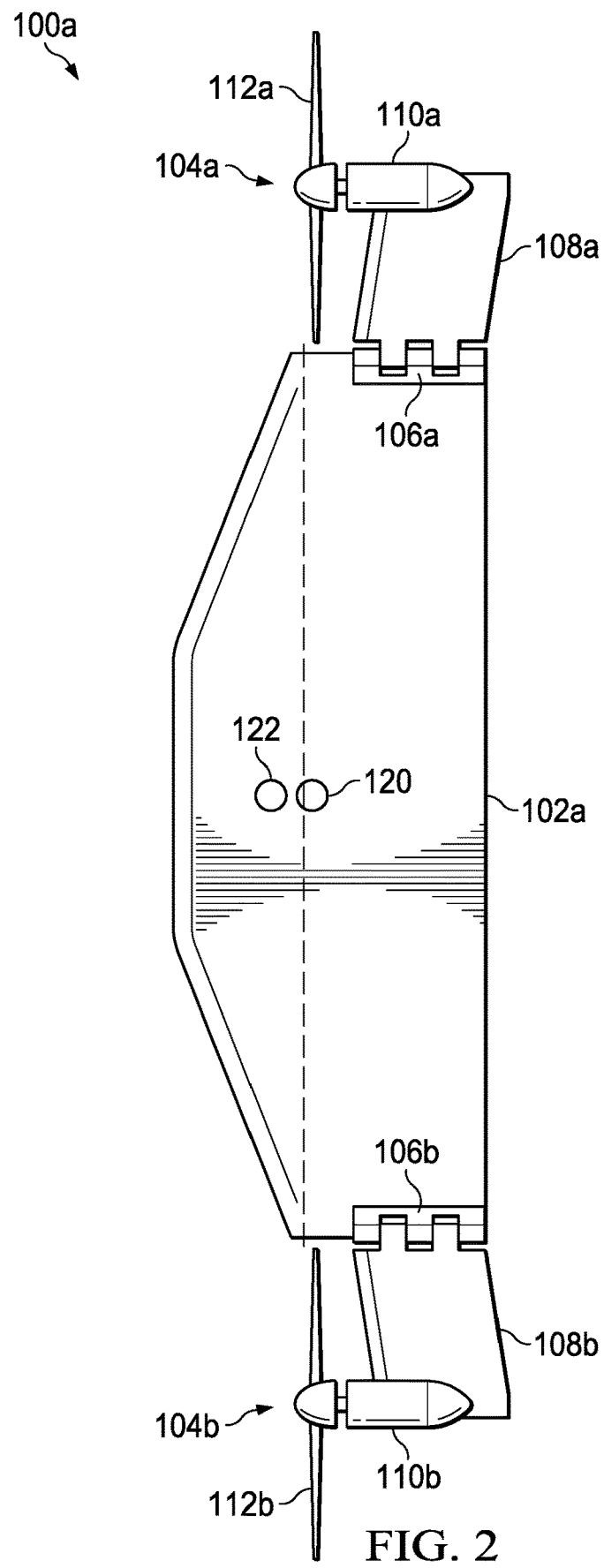
FIG. 2 is simplified diagram of an aircraft in accordance with an embodiment of the present disclosure.

Turning to FIG. 2, FIG. 2 is a simplified diagram of aircraft 100a in a flight configuration, in accordance with an embodiment of the present disclosure. As illustrated in FIG. 2, aircraft 100a can include main body 102a, and propulsion assemblies 104a and 104b, an aerodynamic center 120, and a center of gravity 122. Propulsion assembly 104a can include motor 110a and plurality of rotor blades 112a and propulsion assembly 104b can include motor 110b and plurality of rotor blades 112b. Propulsion assembly 104a can be coupled to motor support arm 108a and propulsion assembly 104b can be coupled to motor support arm 108b. Motor support arm 108a is rotatably coupled to main body 102a using hinge 106a and motor support arm 108b is rotatably coupled to main body 102a using hinge 106b. In an example, aircraft 100a can be configured such that aerodynamic center 120 is behind center of gravity 122 to allow aircraft 100a to be statically stable. In addition, plurality of rotor blades 112a and 112b (and plurality of rotor blades 112c and 112d, not shown) can be behind center of gravity 122. In some examples, as illustrated in FIG. 2, plurality of rotor blades 112a and 112b (and plurality of rotor blades 112c and 112d, not shown) can be proximate to aerodynamic center 120. If they are at or near aerodynamic center 120, then plurality of rotor blades 112a and 112b (and plurality of rotor blades 112c and 112d, not shown) are neither stabilizing or destabilizing. If they are ahead of the aerodynamic center, then they are slightly destabilizing. If they are behind the aerodynamic center, then they are slightly stabilizing. In some current drones, the rotor blades are out ahead of the body. This causes the current drones to be directionally and longitudinally destabilized and force the drone to have surface actuators. In addition, the flight control system of the current drones often having to use effective travel in the control system to buy back stability and have to sacrifice thrust for controlling stability.

Turning to FIG. 3, FIG. 3 is a simplified diagram of aircraft 100a in a perched configuration, in accordance with an embodiment of the present disclosure. As illustrated in FIG. 3, aircraft 100a can include main body 102a, and propulsion assemblies 104a and 104b. Propulsion assembly 104a can include motor 110a and plurality of rotor blades 112a and propulsion assembly 104b can include motor 110b and plurality of rotor blades 112b. Propulsion assembly 104a can be coupled to motor support arm 108a and propulsion assembly 104b can be coupled to motor support arm 108b. Motor support arm 108a is rotatably coupled to main body 102a using hinge 106a and motor support arm 108b is rotatably coupled to main body 102a using hinge 106b.

Aircraft 100a can be configured for vertical take-off and landing from the perched configuration, as illustrated in FIG. 3. In an example, aircraft 100a can be configured for vertical take-off from and landing to a landing zone 124. Landing zone 124 can be ground, a table, a user's hand, or some other relatively flat surface that will allow aircraft 100a to take off and land vertically. More specifically, when motor support arms 108a and 108b (and motor support arms 108c and 108d, not shown) are extended, motor support arms 108a and 108b (and motor support arms 108c and 108d, not shown) can help provide a relatively stable support base for aircraft 100a on landing zone 124.

Figure 4:
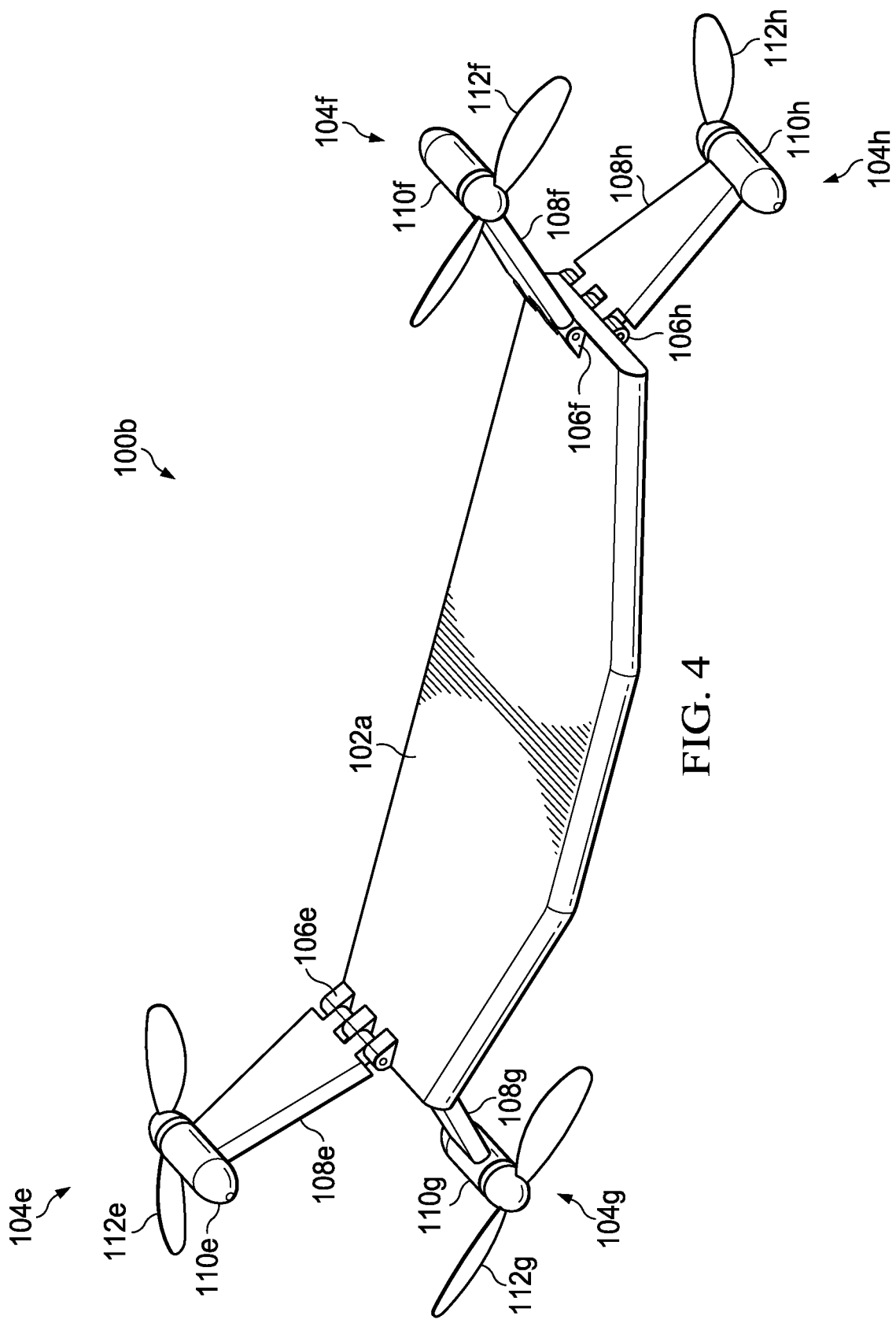
FIG. 4 is simplified diagram of an aircraft in accordance with an embodiment of the present disclosure.

Turning to FIG. 4, FIG. 4 is a simplified diagram of aircraft 100b in a flight configuration, in accordance with an embodiment of the present disclosure. As illustrated in FIG. 4, aircraft 100b can include main body 102a and a plurality of propulsion assemblies 104e-104h. Each of propulsion assemblies 104e-104h can include a motor, and a plurality of rotor blades. More specifically, as illustrated in FIG. 4, propulsion assembly 104e includes motor 110e and a plurality of rotor blades 112e, propulsion assembly 104f includes motor 110f and a plurality of rotor blades 112f, propulsion assembly 104g includes motor 110g and a plurality of rotor blades 112g, and propulsion assembly 104h includes motor 110h and a plurality of rotor blades 112h. In an example, rotor blades 112e of propulsion assembly 104e and rotor blades 112h of propulsion assembly 104h can face an opposite direction of rotor blades 112f of propulsion assembly 104f and rotor blades 112g of propulsion assembly 104g.

Each propulsion assemblies 104e-104h can be coupled to a motor support arm. For example, as illustrated in FIG. 4, propulsion assembly 104e is coupled to motor support arm 108*e*, propulsion assembly 104*f* is coupled to motor support arm 108*f*, propulsion assembly 104*g* is coupled to motor support arm 108*g*, and propulsion assembly 104*h* is coupled to motor support arm 108*h*. Each motor support arm 108*e*-108*h* is rotatably coupled to main body 120*a* using a hinge. For example, as illustrated in FIG. 4, motor support arm 108*e* is rotatably coupled to main body 102*a* using hinge 106*e*, motor support arm 108*f* is rotatably coupled to main body 102*a* using hinge 106*f*, motor support arm 108*g* is rotatably coupled to main body 102*a* using hinge 106*g*, and motor support arm 108*h* is rotatably coupled to main body 102*a* using hinge 106*h*. When propulsion assemblies 104*e*-104*h* are not in use, each of motor support arms 108*e*-108*h* can be folded inward on a corresponding hinge 106*e*-106*h* to enable aircraft 100*b* to have a relatively small footprint during storage, similar to aircraft 100*a* illustrated in FIG. 1C.

Figure 5:
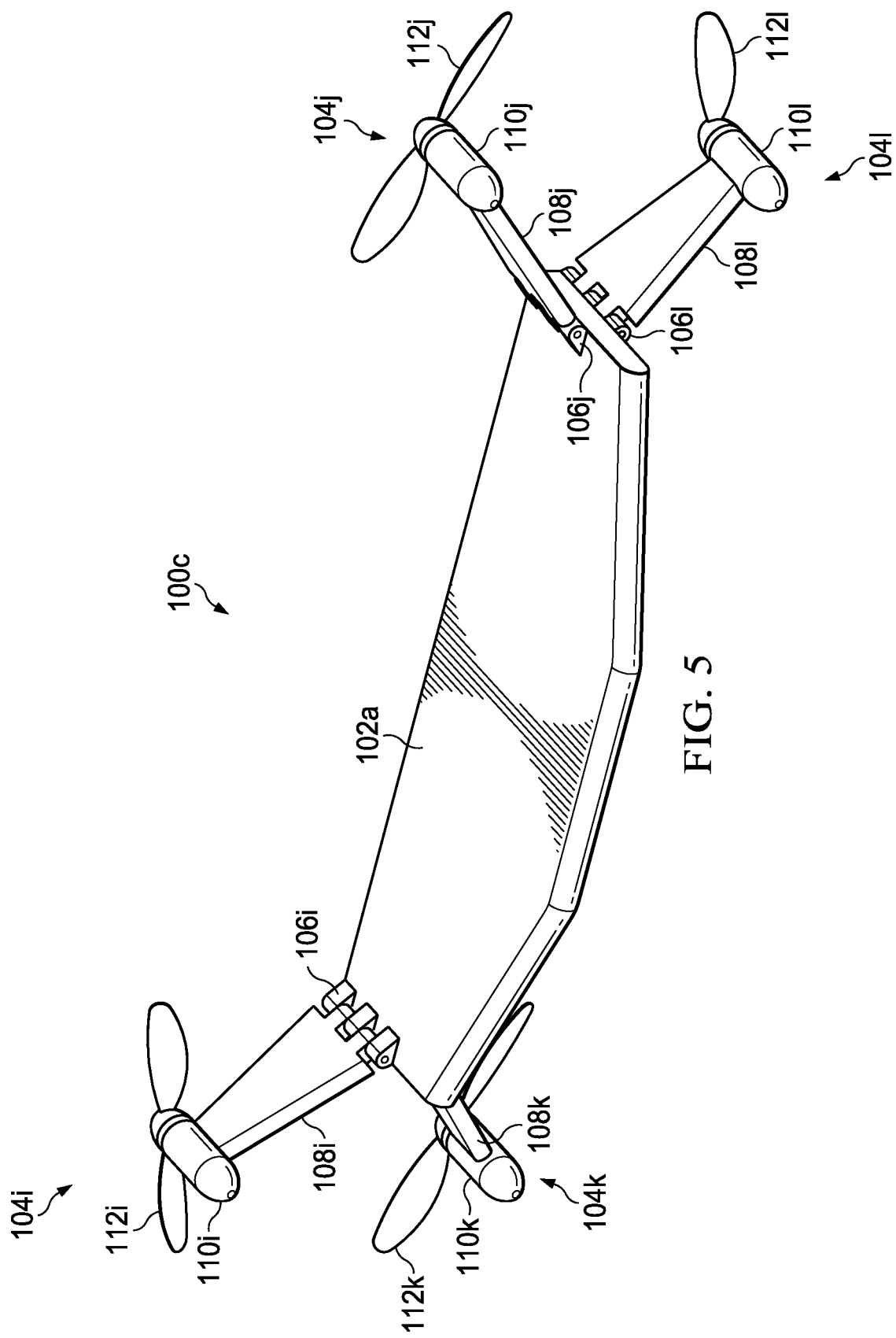
FIG. 5 is simplified diagram of an aircraft in accordance with an embodiment of the present disclosure.

Turning to FIG. 5, FIG. 5 is a simplified diagram of aircraft 100*c* in a flight configuration, in accordance with an embodiment of the present disclosure. As illustrated in FIG. 5, aircraft 100*c* can include main body 102*a* and a plurality of propulsion assemblies 104*i*-104*l*. Each of propulsion assemblies 104*i*-104*l* can include a motor, and a plurality of rotor blades. More specifically, as illustrated in FIG. 5, propulsion assembly 104*i* includes motor 110*i* and a plurality of rotor blades 112*i*, propulsion assembly 104*j* includes motor 110*j* and a plurality of rotor blades 112*j*, propulsion assembly 104*k* includes motor 110*k* and a plurality of rotor blades 112*k*, and propulsion assembly 104*l* includes motor 110*l* and a plurality of rotor blades 112*l*. In an example, rotor blades 112*i* of propulsion assembly 104*i*, rotor blades 112*j* of propulsion assembly 104*j*, rotor blades 112*k* of propulsion assembly 104*k*, and rotor blades 112*l* of propulsion assembly 104*l* can face aft (as opposed to rotor blades 112*a*-112*d* of aircraft 100*a* that face forward, as illustrated in FIG. 1A).

Each propulsion assemblies 104*i*-104*l* can be coupled to a motor support arm. For example, as illustrated in FIG. 5, propulsion assembly 104*i* is coupled to motor support arm 108*i*, propulsion assembly 104*j* is coupled to motor support arm 108*j*, propulsion assembly 104*k* is coupled to motor support arm 108*k*, and propulsion assembly 104*l* is coupled to motor support arm 108*l*. Each motor support arm 108*i*-108*l* is rotatably coupled to main body 102*a* using a hinge. For example, as illustrated in FIG. 5, motor support arm 108*i* is rotatably coupled to main body 102*a* using hinge 106*i*, motor support arm 108*j* is rotatably coupled to main body 102*a* using hinge 106*j*, motor support arm 108*k* is rotatably coupled to main body 102*a* using hinge 106*k*, and motor support arm 108*l* is rotatably coupled to main body 102*a* using hinge 106*l*. When propulsion assemblies 104*i*-104*l* are not in use, each of motor support arms 108*i*-108*l* can be folded inward on a corresponding hinge 106*i*-106*l* to enable aircraft 100*c* to have a relatively small footprint during storage, similar to aircraft 100*a* illustrated in FIG. 1C.

Figure 6A:
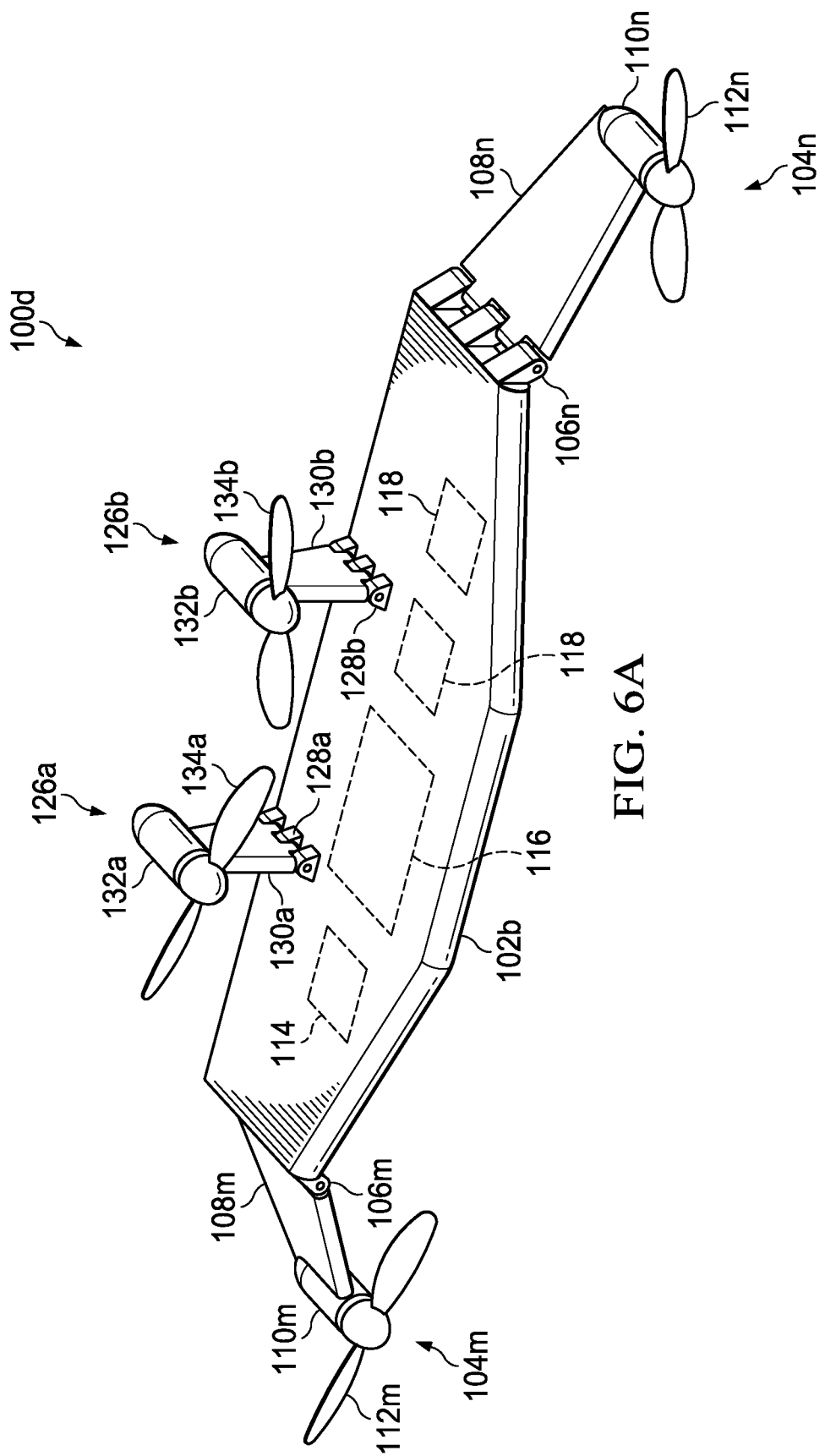
FIG. 6A is simplified diagram of an aircraft in accordance with an embodiment of the present disclosure.

Turning to FIG. 6A, FIG. 6A is a simplified diagram of an aircraft 100*d* in a flight configuration, in accordance with an embodiment of the present disclosure. Aircraft 100*d* is generally configured as a vertical take-off and landing ("VTOL") aircraft, more specifically a convertible drone aircraft, that is operable in a helicopter mode (shown in FIG. 8) associated with vertical take-off from and landing to a landing zone, hover, and sideward and rearward mobility or flight, and an airplane mode (shown in FIG. 6A) associated with forward flight. Additionally, because aircraft 100*d* is a convertible aircraft, it is also operable in a conversion mode when transitioning between the helicopter and airplane modes. Further, being a drone-type aircraft, aircraft 100*d* is configured for remote control and operation. Additionally, at least in some embodiments, aircraft 100*d* may be fully made autonomous and self-directed via a predetermined or pre-programmed location-based guidance system (e.g., global positioning system ("GPS"), coordinate-based location, street address, etc.).

In an example, aircraft 100*d* can include a main body 102*b*, a plurality of propulsion assemblies 104*m* and 104*n*, and a plurality of main body propulsion assemblies 126*a* and 126*b*. Each propulsion assembly 104*m* and 104*n* can include a motor, and a plurality of rotor blades. More specifically, as illustrated in FIG. 6A, propulsion assembly 104*m* includes motor 110*m* and a plurality of rotor blades 112*m* and propulsion assembly 104*n* includes motor 110*n* and a plurality of rotor blades 112*n*. Each main body propulsion assembly 126*a* and 126*b* can include a motor, and a plurality of rotor blades. More specifically, as illustrated in FIG. 6A, main body propulsion assembly 126*a* includes main body propulsion motor 132*a* and a plurality of main body propulsion rotor blades 134*a* and main body propulsion assembly 126*b* includes main body propulsion motor 132*b* and a plurality of main body propulsion rotor blades 134*b*.

Each propulsion assemblies 104*m* and 104*n* can be coupled to a motor support arm. For example, as illustrated in FIG. 6A, propulsion assembly 104*m* is coupled to motor support arm 108*m* and propulsion assembly 104*n* is coupled to motor support arm 108*n*. Each motor support arm 108*m* and 108*n* is rotatably coupled to main body 102*b* using a hinge. For example, as illustrated in FIG. 6A, motor support arm 108*m* is rotatably coupled to main body 102*b* using hinge 106*m* and motor support arm 108*n* is rotatably coupled to main body 102*b* using hinge 106*n*.

In addition, each main body propulsion assembly 126*a* and 126*b* can be coupled to a main body propulsion motor support arm. For example, as illustrated in FIG. 6A, main body propulsion assembly 126*a* is coupled to main body propulsion motor support arm 130*a* and main body propulsion assembly 126*b* is coupled to main body propulsion motor support arm 130*b*. Each main body propulsion motor support arm 130*a* and 130*b* is rotatably coupled to main body 102*b* using a hinge. For example, as illustrated in FIG. 6A, main body propulsion motor support arm 130*a* is rotatably coupled to main body 102*b* using main body hinge 128*a* and main body propulsion motor support arm 130*b* is rotatably coupled to main body 102*b* using main body hinge 128*b*.

Main body 102*b* can include flight controller 114, battery 116, and electronics 118. Main body 102*b* can help provides lift to aircraft 100*d* during forward flight while also maintaining a relatively small footprint of aircraft 100*d*. Each of motor support arms 108*m* and 108*n* provide structure and support propulsion assemblies 104*m* and 104*n* and each of main body propulsion motor support arms 130*a* and 130*b* provide structure and support to main body propulsion assemblies 126*a* and 126*b* during operation of aircraft 100*d*. During use, the ends of main body 102*b*, propulsion assemblies 104*m* and 104*n* and main body propulsion assemblies 126*a* and 126*b* can help to provide a base and act or function as the landing gear. In the embodiment shown, each motor 110*m* and 110*n* and each main body propulsion motor 132*a* and 132*b* is an electric motor. However, in other embodiments, each motor 110*m* and 110*n* and each main body propulsion motor 132*a* and 132*b* may be a combustion engines or auxiliary power unit through a plurality of interconnect driveshafts and/or auxiliary gearboxes. Furthermore, because aircraft 100*d* functions as a convertible aircraft, the rotational speeds of each rotor blades 112*m* and 112*n* and main body propulsion rotor blades 134*a* and 134*b* may be selectively controlled to orient aircraft 100*d* in the various flight modes.

Figure 6B:
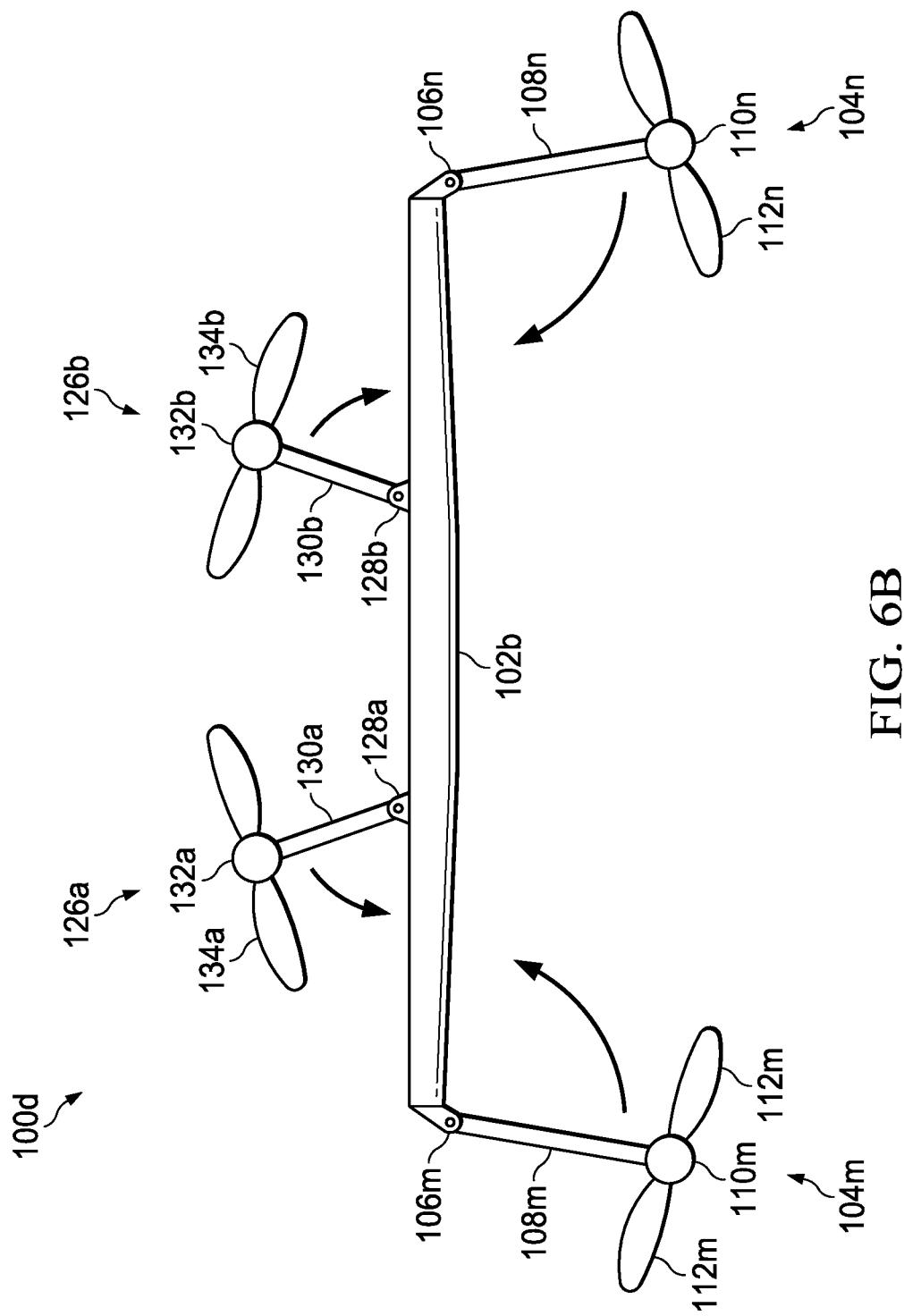
FIG. 6B is simplified diagram of an aircraft in accordance with an embodiment of the present disclosure.

Turning to FIG. 6B, FIG. 6B is a simplified diagram of aircraft 100*d* in transition from a flight configuration to a stored configuration, in accordance with an embodiment of the present disclosure. Aircraft 100*d* can include main body 102*b*, plurality of propulsion assemblies 104*m* and 104*n*, and plurality of main body propulsion assemblies 126*a* and 126*b*. Propulsion assembly 104*m* includes motor 110*m* and plurality of rotor blades 112*m* and propulsion assembly 104*n* includes motor 110*n* and plurality of rotor blades 112*n*. Main body propulsion assembly 126*a* includes main body propulsion motor 132*a* and plurality of main body propulsion rotor blades 134*a* and main body propulsion assembly 126*b* includes main body propulsion motor 132*b* and plurality of main body propulsion rotor blades 134*b*.

Propulsion assembly 104*m* is coupled to motor support arm 108*m* and propulsion assembly 104*n* is coupled to motor support arm 108*n*. Motor support arm 108*m* is rotatably coupled to main body 102*b* using hinge 106*m* and motor support arm 108*n* is rotatably coupled to main body 102*b* using hinge 106*n*. Main body propulsion assembly 126*a* is coupled to main body propulsion motor support arm 130*a* and main body propulsion assembly 126*b* is coupled to main body propulsion motor support arm 130*b*. Main body propulsion motor support arm 130*a* is rotatably coupled to main body 102*b* using main body hinge 128*a* and main body propulsion motor support arm 130*b* is rotatably coupled to main body 102*b* using main body hinge 128*b*. More specifically, as illustrated in FIG. 6B, motor support arm 108*m* can be rotated inwards and towards main body 102*b* using hinge 106*m* and motor support arm 108*n* can be rotated inwards and towards main body 102*b* using hinge 106*n*. In addition, main body propulsion motor support arm 130*a* can be rotated outwards and towards main body 102*b* using main body hinge 128*a* and main body propulsion motor support arm 130*b* can be rotated outwards and towards main body 102*b* using main body hinge 128*b*.

Turning to FIG. 6C, FIG. 6C is a simplified diagram of aircraft 100*d* in a stored configuration, in accordance with an embodiment of the present disclosure. Aircraft 100*d* can include main body 102*b*, plurality of propulsion assemblies 104*m* and 104*n*, and plurality of main body propulsion assemblies 126*a* and 126*b*. Propulsion assembly 104*m* includes motor 110*m* and plurality of rotor blades 112*m* and propulsion assembly 104*n* includes motor 110*n* and plurality of rotor blades 112*n*. Main body propulsion assembly 126*a* includes main body propulsion motor 132*a* and plurality of main body propulsion rotor blades 134*a* and main body propulsion assembly 126*b* includes main body propulsion motor 132*b* and plurality of main body propulsion rotor blades 134*b*.

Propulsion assembly 104*m* is coupled to motor support arm 108*m* and propulsion assembly 104*n* is coupled to motor support arm 108*n*. Motor support arm 108*m* is rotatably coupled to main body 102*b* using hinge 106*m* and motor support arm 108*n* is rotatably coupled to main body 102*b* using hinge 106*n*. Main body propulsion assembly 126*a* is coupled to main body propulsion motor support arm 130*a* and main body propulsion assembly 126*b* is coupled to main body propulsion motor support arm 130*b*. Main body propulsion motor support arm 130*a* is rotatably coupled to main body 102*b* using main body hinge 128*a* and main body propulsion motor support arm 130*b* is rotatably coupled to main body 102*b* using main body hinge 128*b*. When propulsion assemblies 104*m* and 104*n* and main body propulsion assemblies 126*a* and 126*b* are not in use, each of motor support arms 108*m* and 108*n* can be folded inward on a corresponding hinge 106*m* and 106*n* and main body propulsion motor support arms 130*a* and 130*b* can be folded inward on a corresponding main body hinge 128*a* and 128*b* to help aircraft 100*b* have a relatively small footprint during storage. More specifically, as illustrated in FIG. 6C, motor support arm 108*m* can be rotated towards main body 102*b* using hinge 106*m*, motor support arm 108*n* can be rotated towards main body 102*b* using hinge 106*n*, main body propulsion motor support arm 130*a* can be rotated towards main body 102*b* using main body hinge 128*a*, and main body propulsion motor support arm 130*b* can be rotated towards main body 102*b* using main body hinge 128*b*. This allows aircraft 100*b* to occupy a relatively small footprint when not in use and/or being stored.

Figure 7:
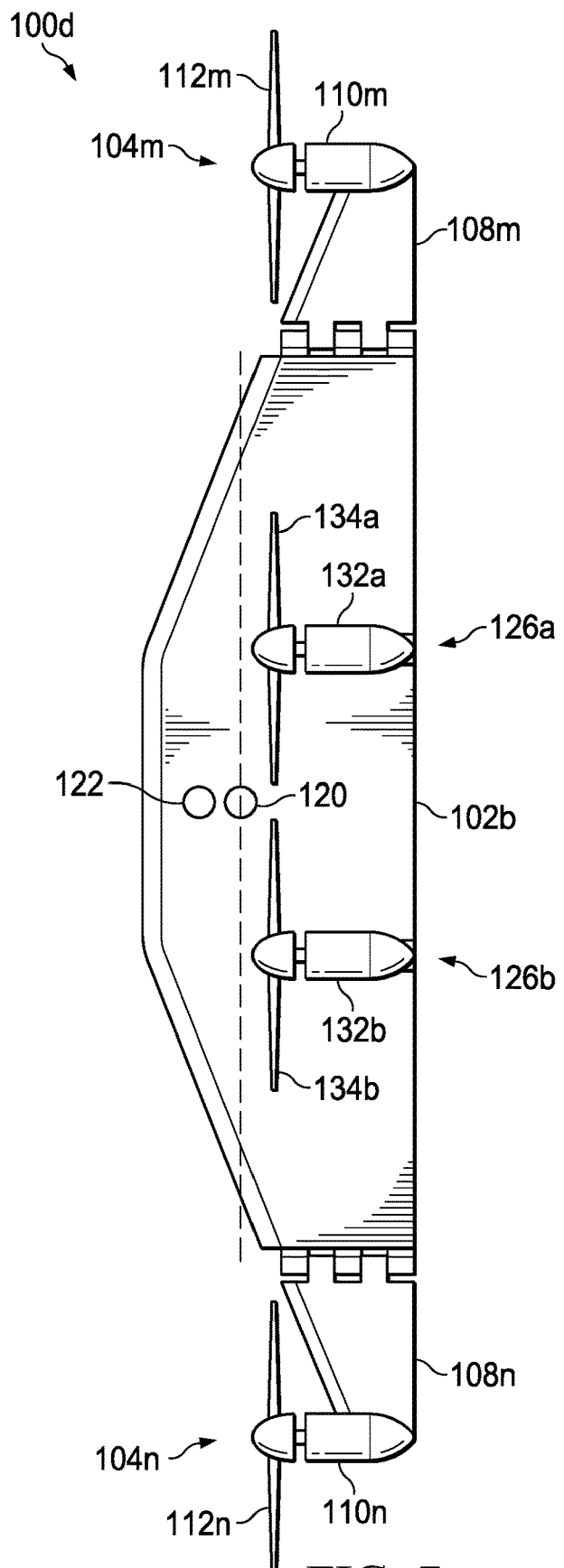
FIG. 7 is simplified diagram of an aircraft in accordance with an embodiment of the present disclosure.

Turning to FIG. 7, FIG. 7 is a simplified diagram of aircraft 100*d* in a flight configuration, in accordance with an embodiment of the present disclosure. As illustrated in FIG. 7, aircraft 100*d* can include main body 102*b*, plurality of propulsion assemblies 104*m* and 104*n*, plurality of main body propulsion assemblies 126*a* and 126*b*, aerodynamic center 120, and center of gravity 122. Propulsion assembly 104*m* includes motor 110*m* and plurality of rotor blades 112*m* and propulsion assembly 104*n* includes motor 110*n* and plurality of rotor blades 112*n*. Main body propulsion assembly 126*a* includes main body propulsion motor 132*a* and plurality of main body propulsion rotor blades 134*a* and main body propulsion assembly 126*b* includes main body propulsion motor 132*b* and plurality of main body propulsion rotor blades 134*b*. Propulsion assembly 104*m* is coupled to motor support arm 108*m* and propulsion assembly 104*n* is coupled to motor support arm 108*n*. Motor support arm 108*m* is rotatably coupled to main body 102*b* using hinge 106*m* and motor support arm 108*n* is rotatably coupled to main body 102*b* using hinge 106*n*.

In an example, aircraft 100*d* can be configured such that aerodynamic center 120 is behind center of gravity 122 to allow aircraft 100*d* to be statically stable. In addition, plurality of rotor blades 112*m* and 112*n* and plurality of main body propulsion rotor blades 134*a* and 134*b* can be behind center of gravity 122. In some examples, as illustrated in FIG. 7, plurality of rotor blades 112*m* and 112*n* and plurality of main body propulsion rotor blades 134*a* and 134*b* can be proximate to or behind aerodynamic center 120. If they are at or near aerodynamic center 120, then plurality of rotor blades 112*m* and 112*n* and plurality of main body propulsion rotor blades 134*a* and 134*b* are neither stabilizing or destabilizing. If they are ahead of the aerodynamic center, then they are slightly destabilizing. If they are behind the aerodynamic center, then they are slightly stabilizing.

Figure 8:
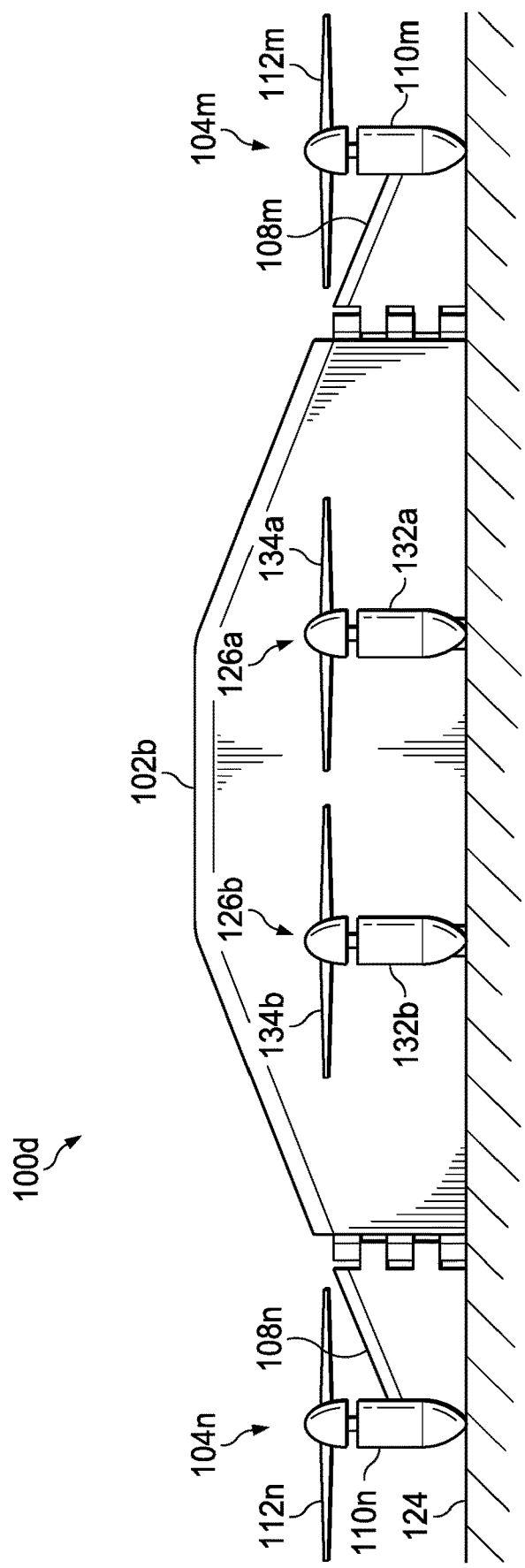
FIG. 8 is simplified diagram of an aircraft in accordance with an embodiment of the present disclosure.

Turning to FIG. 8, FIG. 8 is a simplified diagram of aircraft 100*d* in a perched configuration, in accordance with an embodiment of the present disclosure. As illustrated in FIG. 8, aircraft 100*a* can include main body 102*b*, plurality of propulsion assemblies 104*m* and 104*n*, and plurality of main body propulsion assemblies 126*a* and 126*b*. Propulsion assembly 104*m* includes motor 110*m* and plurality of rotor blades 112*m* and propulsion assembly 104*n* includes motor 110*n* and plurality of rotor blades 112*n*. Main body propulsion assembly 126*a* includes main body propulsion motor 132*a* and plurality of main body propulsion rotor blades 134*a* and main body propulsion assembly 126*b* includes main body propulsion motor 132*b* and plurality of main body propulsion rotor blades 134*b*. Propulsion assembly 104*m* is coupled to motor support arm 108*m* and propulsion assembly 104*n* is coupled to motor support arm 108n. Motor support arm 108m is rotatably coupled to main body 102b using hinge 106m and motor support arm 108n is rotatably coupled to main body 102b using hinge 106n.

Aircraft 100d can be configured for vertical take-off and landing from the perched configuration, illustrated in FIG. 8. In an example, aircraft 100d can be configured for vertical take-off from and landing to landing zone 124. Landing zone 124 can be ground, a table, a user's hand, or some other relatively flat surface that will allow aircraft 100d to take off and land vertically. More specifically, when motor support arms 108m and 108n are extended, motor support arms 108a and 108b, propulsion assemblies 104m and 104n, and main body propulsion assemblies 126a and 126b can help provide a relatively stable support base for aircraft 100d on landing zone 124.

Figure 9A:
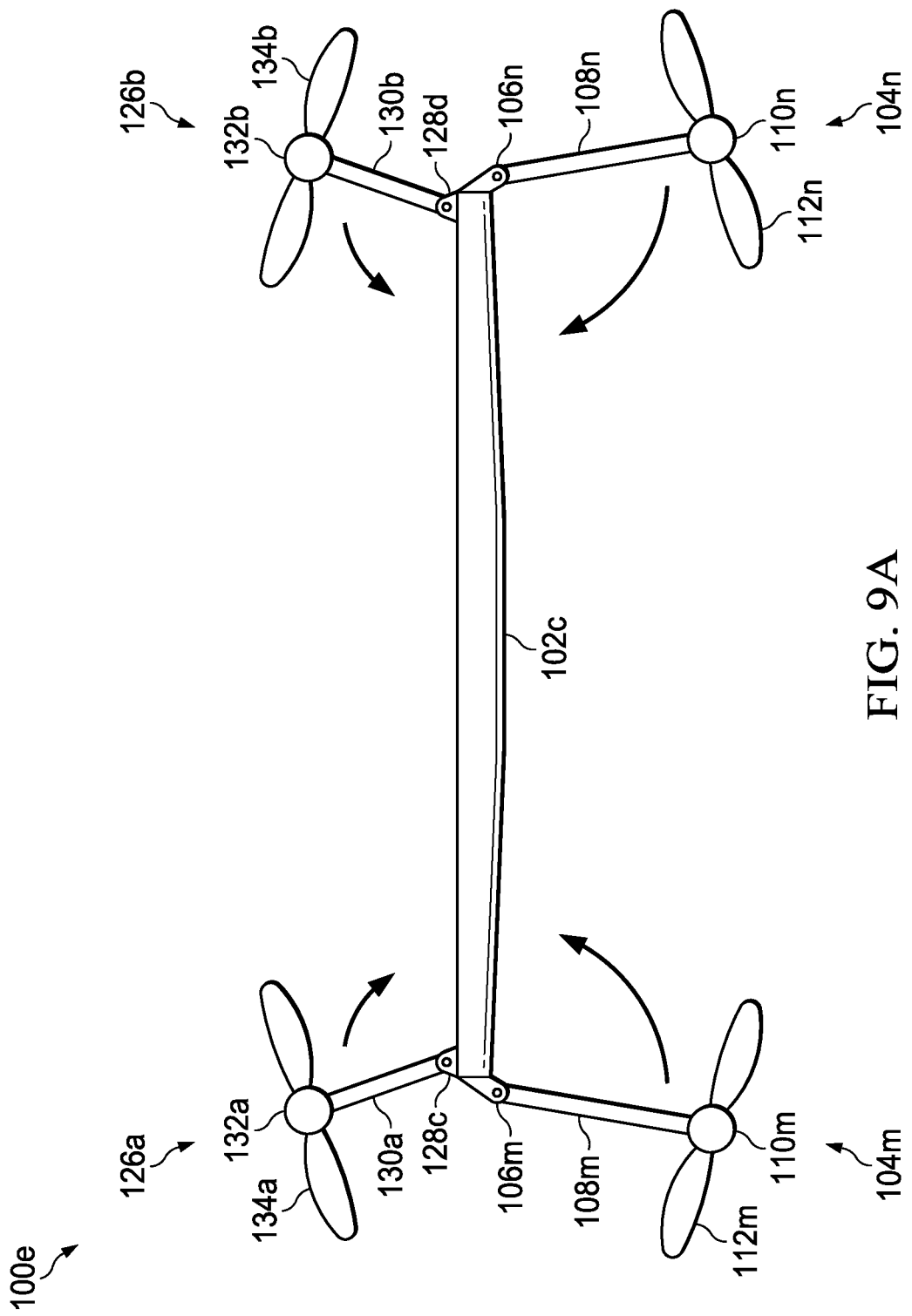
FIG. 9A is simplified diagram of an aircraft in accordance with an embodiment of the present disclosure.

Turning to FIG. 9A, FIG. 9A is a simplified diagram of aircraft 100e in transition from a flight configuration to a stored configuration, in accordance with an embodiment of the present disclosure. Aircraft 100e can include main body 102c, plurality of propulsion assemblies 104m and 104n, and plurality of main body propulsion assemblies 126a and 126b. Propulsion assembly 104m includes motor 110m and plurality of rotor blades 112m and propulsion assembly 104n includes motor 110n and plurality of rotor blades 112n. Main body propulsion assembly 126a includes main body propulsion motor 132a and plurality of main body propulsion rotor blades 134a and main body propulsion assembly 126b includes main body propulsion motor 132b and plurality of main body propulsion rotor blades 134b.

Propulsion assembly 104m is coupled to motor support arm 108m and propulsion assembly 104n is coupled to motor support arm 108n. Motor support arm 108m is rotatably coupled to main body 102c using hinge 106m and motor support arm 108n is rotatably coupled to main body 102c using hinge 106n. Main body propulsion assembly 126a is coupled to main body propulsion motor support arm 130a and main body propulsion assembly 126b is coupled to main body propulsion motor support arm 130b. Main body propulsion motor support arm 130a is rotatably coupled to main body 102c using main body hinge 128c and main body propulsion motor support arm 130b is rotatably coupled to main body 102c using main body hinge 128d. More specifically, as illustrated in FIG. 9A, motor support arm 108m can be rotated inwards and towards main body 102c using hinge 106m and motor support arm 108n can be rotated inwards and towards main body 102c using hinge 106n. In addition, main body propulsion motor support arm 130a can be rotated inwards and towards main body 102c using main body hinge 128c and main body propulsion motor support arm 130b can be rotated inwards and towards main body 102c using main body hinge 128d.

Figure 9B:
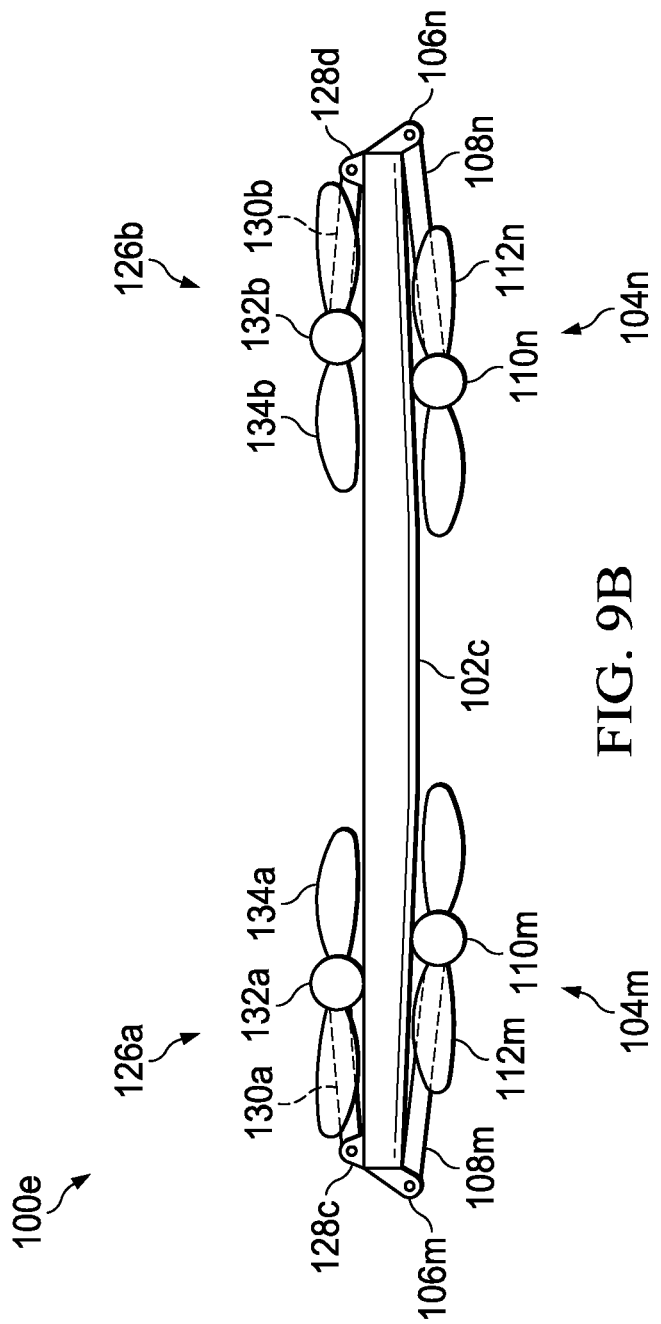
FIG. 9B is simplified diagram of an aircraft in accordance with an embodiment of the present disclosure.

Turning to FIG. 9B, FIG. 9B is a simplified diagram of aircraft 100e in transition from a flight configuration to a stored configuration, in accordance with an embodiment of the present disclosure. Aircraft 100e can include main body 102c, plurality of propulsion assemblies 104m and 104n, and plurality of main body propulsion assemblies 126a and 126b. Propulsion assembly 104m includes motor 110m and plurality of rotor blades 112m and propulsion assembly 104n includes motor 110n and plurality of rotor blades 112n. Main body propulsion assembly 126a includes main body propulsion motor 132a and plurality of main body propulsion rotor blades 134a and main body propulsion assembly 126b includes main body propulsion motor 132b and plurality of main body propulsion rotor blades 134b.

Propulsion assembly 104m is coupled to motor support arm 108m and propulsion assembly 104n is coupled to motor support arm 108n. Motor support arm 108m is rotatably coupled to main body 102c using hinge 106m and motor support arm 108n is rotatably coupled to main body 102c using hinge 106n. Main body propulsion assembly 126a is coupled to main body propulsion motor support arm 130a and main body propulsion assembly 126b is coupled to main body propulsion motor support arm 130b. Main body propulsion motor support arm 130a is rotatably coupled to main body 102c using main body hinge 128c and main body propulsion motor support arm 130b is rotatably coupled to main body 102c using main body hinge 128d. Motor support arm 108m can be rotated inwards and towards main body 102c using hinge 106m and motor support arm 108n can be rotated inwards and towards main body 102c using hinge 106n. In addition, main body propulsion motor support arm 130a can be rotated inwards and towards main body 102c using main body hinge 128c and main body propulsion motor support arm 130b can be rotated inwards and towards main body 102c using main body hinge 128d. More specifically, as illustrated in FIG. 9B, motor support arm 108m can be rotated inwards towards main body 102c using hinge 106m, motor support arm 108n can be rotated inwards towards main body 102c using hinge 106n, main body propulsion motor support arm 130a can be rotated inwards towards main body 102c using main body hinge 128c, and main body propulsion motor support arm 130b can be rotated inwards towards main body 102c using main body hinge 128d. This allows aircraft 100e to occupy a relatively small footprint when not in use and/or being stored.

Figure 10A:
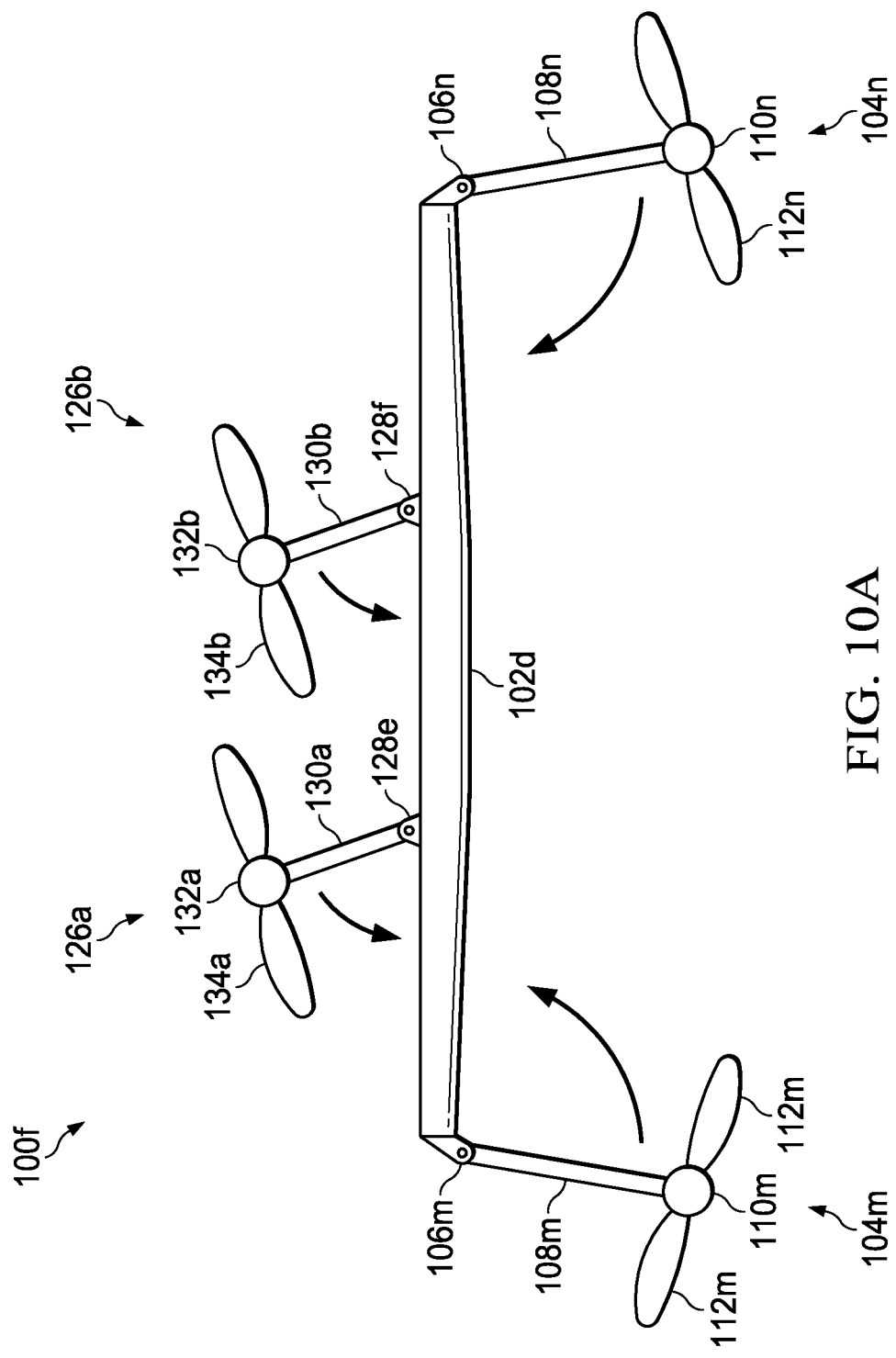
FIG. 10A is simplified diagram of an aircraft in accordance with an embodiment of the present disclosure.

Turning to FIG. 10A, FIG. 10A is a simplified diagram of aircraft 100f in transition from a flight configuration to a stored configuration, in accordance with an embodiment of the present disclosure. Aircraft 100f can include main body 102d, plurality of propulsion assemblies 104m and 104n, and plurality of main body propulsion assemblies 126a and 126b. Propulsion assembly 104m includes motor 110m and plurality of rotor blades 112m and propulsion assembly 104n includes motor 110n and plurality of rotor blades 112n. Main body propulsion assembly 126a includes main body propulsion motor 132a and plurality of main body propulsion rotor blades 134a and main body propulsion assembly 126b includes main body propulsion motor 132b and plurality of main body propulsion rotor blades 134b.

Propulsion assembly 104m is coupled to motor support arm 108m and propulsion assembly 104n is coupled to motor support arm 108n. Motor support arm 108m is rotatably coupled to main body 102d using hinge 106m and motor support arm 108n is rotatably coupled to main body 102d using hinge 106n. Main body propulsion assembly 126a is coupled to main body propulsion motor support arm 130a and main body propulsion assembly 126b is coupled to main body propulsion motor support arm 130b. Main body propulsion motor support arm 130a is rotatably coupled to main body 102d using main body hinge 128e and main body propulsion motor support arm 130b is rotatably coupled to main body 102d using main body hinge 128f. More specifically, as illustrated in FIG. 10A, motor support arm 108m can be rotated inwards and towards main body 102d using hinge 106m and motor support arm 108n can be rotated inwards and towards main body 102d using hinge 106n. In addition, main body propulsion motor support arm 130a can be rotated outwards and towards main body 102d using main body hinge 128e and main body propulsion motor support arm 130b can be rotated inwards and towards main body 102d using main body hinge 128f.

Figure 10B:
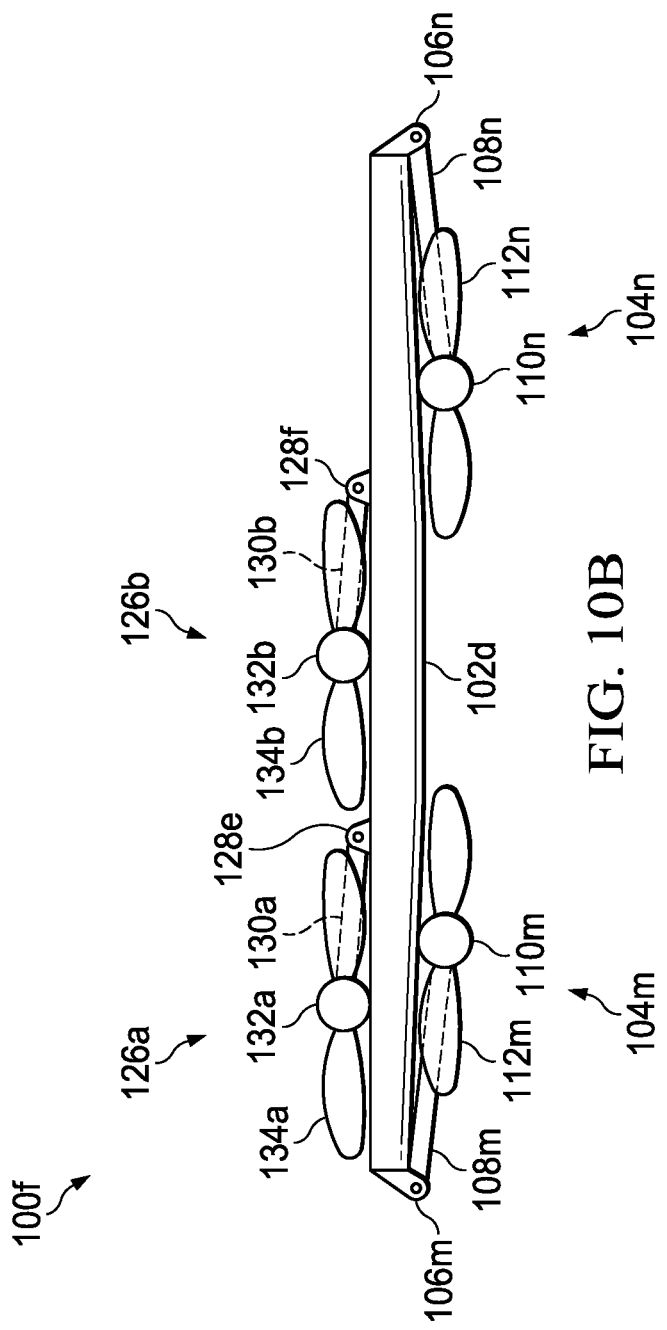
FIG. 10B is simplified diagram of an aircraft in accordance with an embodiment of the present disclosure.

Turning to FIG. 10B, FIG. 10B is a simplified diagram of aircraft 100f in transition from a flight configuration to a stored configuration, in accordance with an embodiment of the present disclosure. Aircraft 100f can include main body 102d, plurality of propulsion assemblies 104m and 104n, and plurality of main body propulsion assemblies 126a and 126b. Propulsion assembly 104m includes motor 110m and plurality of rotor blades 112m and propulsion assembly 104n includes motor 110n and plurality of rotor blades 112n. Main body propulsion assembly 126a includes main body propulsion motor 132a and plurality of main body propulsion rotor blades 134a and main body propulsion assembly 126b includes main body propulsion motor 132b and plurality of main body propulsion rotor blades 134b.

Propulsion assembly 104m is coupled to motor support arm 108m and propulsion assembly 104n is coupled to motor support arm 108n. Motor support arm 108m is rotatably coupled to main body 102d using hinge 106m and motor support arm 108n is rotatably coupled to main body 102d using hinge 106n. Main body propulsion assembly 126a is coupled to main body propulsion motor support arm 130a and main body propulsion assembly 126b is coupled to main body propulsion motor support arm 130b. Main body propulsion motor support arm 130a is rotatably coupled to main body 102d using main body hinge 128e and main body propulsion motor support arm 130b is rotatably coupled to main body 102d using main body hinge 128f. Motor support arm 108m can be rotated inwards and towards main body 102d using hinge 106m and motor support arm 108n can be rotated inwards and towards main body 102d using hinge 106n. In addition, main body propulsion motor support arm 130a can be rotated outwards and towards main body 102d using main body hinge 128e and main body propulsion motor support arm 130b can be rotated inwards and towards main body 102d using main body hinge 128f. More specifically, as illustrated in FIG. 10B, motor support arm 108m can be rotated inwards towards main body 102d using hinge 106m, motor support arm 108n can be rotated inwards towards main body 102d using hinge 106n, main body propulsion motor support arm 130a can be rotated outwards towards main body 102d using main body hinge 128e, and main body propulsion motor support arm 130b can be rotated inwards towards main body 102d using main body hinge 128f. This allows aircraft 100f to occupy a relatively small footprint when not in use and/or being stored.

In an example, each of hinges 106a-106n and main body hinge 128a-128f may be a spring or latch type hinge that allows a motor support arm coupled to the main body using the hinge to rotate or pivot relative to the main body (e.g., motor support arm 108a can rotate or pivot relative to main body 102a using hinge 106a). In other examples, each of hinges 106a-106n and main body hinge 128a-128f may be some other type of hinge that allows a motor support arm coupled to the main body using the hinge to rotate or pivot relative to the main body. In some examples, each type of hinge is the same or similar. In other examples, the type of hinge is different, for example, hinge 106n may be different than main body hinge 128a.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although aircraft 100a-100d have been illustrated with reference to particular elements and operations that facilitate the thermal cooling process, these elements and operations may be replaced by any suitable architecture, protocols, and/or processes that achieve the intended functionality disclosed herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1, is an aircraft including a main body, a plurality of propulsion assemblies, and a plurality of hinges, wherein each of the plurality of propulsion assemblies is rotatably coupled to the main body using a hinge from the plurality of hinges.

In Example A2, the subject matter of Example A1 can optionally include a plurality of motor support arms, wherein each motor support arm rotatably couples a specific propulsion assembly to a specific corresponding hinge from the plurality of hinges.

In Example A3, the subject matter of any one of Examples A1-A2 can optionally include where each of the plurality of motor support arms can rotate the specific propulsion assembly towards the main body to a storage configuration and can rotate the specific propulsion assembly away from the main body to a flight configuration.

In Example A4, the subject matter of any one of Examples A1-A3 can optionally include four motor support arms, wherein each motor support arm rotatably couples a specific propulsion assembly to a specific corresponding hinge from the plurality of hinges and increases a span of the aircraft when in a flight configuration.

In Example A5, the subject matter of any one of Examples A1-A4 can optionally include where at least two propulsion assemblies from the plurality of propulsion assemblies are rotatably coupled the main body.

In Example A6, the subject matter of any one of Examples A1-A5 can optionally include where each of plurality of propulsion assemblies includes a motor and a plurality of blades.

In Example A7, the subject matter of any one of Examples A1-A6 can optionally include where motors are electric.

In Example A8, the subject matter of any one of Examples A1-A7 can optionally include where the aircraft is a drone.

In Example A9, the subject matter of any one of Examples A1-A8 can optionally include where the aircraft is a vertical take-off and landing vehicle ("VTOL").

In Example A10, the subject matter of any one of Examples A1-A9 can optionally include where the aircraft does not include any surface actuators.

Example AA1 is a drone having a flight configuration and a storage configuration, the drone comprising a main body, a plurality of propulsion assemblies, a plurality of hinges, and a plurality of motor support arms, wherein each motor support arm rotatably couples a specific propulsion assembly to a specific corresponding hinge to allow the drone to transition from the flight configuration, to the storage configuration where the plurality of propulsion assemblies are rotated towards the main body, and back to the flight configuration where the plurality of propulsion assemblies are rotated away from the main body.

In Example AA2, the subject matter of Example AA1 can optionally include where at least a portion of the plurality of the motor support arms increase a span of the drone when the drone is in the flight configuration.

In Example AA3, the subject matter of any one of the Examples AA1-AA2 can optionally include where the drone is configured for a vertical take-off from a perched position.

In Example AA4, the subject matter of any one of the Examples AA1-AA3 can optionally include where the drone does not include any surface actuators.

Example M1 is a method including rotating a plurality of propulsion assemblies away from a main body of an aircraft to transition the aircraft from a stored configuration to a flight configuration and operating the aircraft while the aircraft is in the flight configuration.

In Example M2, the subject matter of Example M1 can optionally include where the aircraft includes a plurality of motor support arms and each motor support arm rotatably couples a specific propulsion assembly to a specific hinge on the main body of the aircraft.

In Example M3, the subject matter of any one of the Examples M1-M2 can optionally include where the aircraft includes four motor support arms and each motor support arm rotatably couples a specific propulsion assembly to a specific corresponding hinge on the main body of the aircraft and increases a span of the aircraft when the aircraft is in the flight configuration.

In Example M4, the subject matter of any one of the Examples M1-M3 can optionally include where at least two propulsion assemblies from the plurality of propulsion assemblies are rotatably coupled the main body.

In Example M5, the subject matter of any one of the Examples M1-M4 can optionally include where the aircraft is a vertical take-off and landing vehicle ("VTOL").

In Example M6, the subject matter of any one of the Examples M1-M5 can optionally include where the aircraft does not include any surface actuators.

What is claimed is:

1. An aircraft, comprising:
    a main body comprising a first side and a second side opposite the first side; and
    a plurality of propulsion assemblies comprising:
        a pair of first propulsion assemblies rotatably coupled to outboard ends of the main body, the first pair of propulsion assemblies rotatable toward each other to a storage position and away from each other to a flight position, wherein in the storage position, the first pair of propulsion assemblies lie in contact with the first side of the main body; and
        a pair of second propulsion assemblies rotatably coupled to the second side of the main body inboard of the first propulsion assemblies, the second pair of propulsion assemblies rotatable toward the second side of the main body to a storage position and away from the second side of the main body to a flight position, wherein in the storage position, the second pair of propulsion assemblies lie in contact with the second side of the main body.

2. The aircraft of claim 1, wherein each of plurality of propulsion assemblies includes a motor and a plurality of blades.

3. The aircraft of claim 2, wherein the motors are electric.

4. The aircraft of claim 1, wherein the aircraft is a drone.

5. The aircraft of claim 1, wherein the aircraft is a vertical take-off and landing vehicle (VTOL).

6. The aircraft of claim 1, wherein the aircraft does not include any surface actuators.

7. The aircraft of claim 1, further comprising a plurality of motor support arms including:
    a pair of first motor support arms, wherein each of the first motor support arms rotatably couples one of the first propulsion assemblies to one of the outboard ends of the main body via a hinge; and
    a pair of second motor support arms, wherein each of the second motor support arms rotatably couples one of the second propulsion assemblies to the second side of the main body via a hinge.

8. The aircraft of claim 7, wherein the first motor support arms are longer than the second motor support arms.

9. A drone having a flight configuration and a storage configuration, the drone comprising:
    a main body comprising a first side and a second side opposite the first side;
    a plurality of propulsion assemblies comprising:
        a pair of first propulsion assemblies rotatably coupled to outboard ends of the main body; and
        a pair of second propulsion assemblies rotatably coupled to the second side of the main body inboard of the first propulsion assemblies; and
    a plurality of motor support arms comprising a pair of first motor support arms, wherein each of the first motor support arms rotatably couples one of the first propulsion assemblies to one of the outboard ends of the main body via a hinge, and a pair of second motor support arms, wherein each of the second motor support arms rotatably couples one of the second propulsion assemblies to the second side of the main body via a hinge, to allow the drone to transition between the flight configuration, in which the plurality of propulsion assemblies are rotated away from the main body, and the storage configuration, in which the first pair of propulsion assemblies are rotated towards each other to lie substantially flat against the first side of the main body and the second pair of propulsion assemblies are rotated to lie substantially flat against the second side of the main body;
    wherein the motor support arms are fin-shaped and function as a landing gear for the drone.

10. The drone of claim 9, wherein at least a portion of the plurality of the motor support arms increase a span of the drone when the drone is in the flight configuration.

11. The drone of claim 9, wherein the drone is configured for a vertical take-off from a perched position.

12. The drone of claim 9, wherein the drone does not include any surface actuators.

13. The drone of claim 9, wherein the pair of second propulsion assemblies rotate in opposite directions when transitioning from the flight configuration to the storage configuration.

14. The drone of claim 9, wherein the pair of second propulsion assemblies rotate in the same direction when transitioning from the flight configuration to the storage configuration.

15. An aircraft, comprising:
    a main body comprising a first side and a second side opposite the first side; and a plurality of propulsion assemblies comprising:
- a pair of first propulsion assemblies rotatably coupled to outboard ends of the main body; and
- a pair of second propulsion assemblies rotatably coupled to the second side of the main body; and a plurality of motor support arms comprising:
- a pair of first motor support arms, wherein each of the first motor support arms rotatably couples one of the first propulsion assemblies to one of the outboard ends first side of the main body via a hinge, the first pair of motor support arms rotatable toward each other to a storage position and away from each other to a flight position, wherein in the storage position, the first pair of propulsion assemblies lie in contact with the first side of the main body; and
- a pair of second motor support arms, wherein each of the second motor support arms rotatably couples one of the second propulsion assemblies to the second side of the main body via a hinge, the second pair of motor support arms rotatable toward the second side of the main body to a storage position and away from the second side of the main body to a flight position, wherein in the storage position, the second pair of propulsion assemblies lie in contact with the second side of the main body;

wherein the first motor support arms are shorter than the second motor support arms.

16. The aircraft of claim 15, wherein each of plurality of propulsion assemblies includes a motor and a plurality of blades.

17. The aircraft of claim 16, wherein the motors are electric.

18. The aircraft of claim 15, wherein the aircraft is a drone.

19. The aircraft of claim 15, wherein the aircraft is a vertical take-off and landing vehicle (VTOL).

* * * * *